(12) United States Patent
Nguyen (10) Patent No.: US 8,970,744 B2
(45) Date of Patent: Mar. 3, 2015

(54) TWO-DIMENSIONAL LENS SHADING CORRECTION

(75) Inventor: Hugh Phu Nguyen, San Jose, CA (US)

(73) Assignee: Imagination Technologies Limited (GB)

( * ) Notice: Subject to any disclaimer, the term of this patent is extended or adjusted under 35 U.S.C. 154(b) by 202 days.

(21) Appl. No.: 12/496,677

(22) Filed: Jul. 2, 2009

(65) Prior Publication Data

US 2011/0001848 A1  Jan. 6, 2011

(51) Int. Cl.
*H04N 9/64* (2006.01)
*H04N 5/235* (2006.01)
*H04N 5/217* (2011.01)
*H04N 5/357* (2011.01)

(52) U.S. Cl.
CPC .................................. *H04N 5/3572* (2013.01)
USPC ..................... 348/251; 348/229.1; 348/230.1; 348/241

(58) Field of Classification Search
USPC ........ 348/207.99, 222.1, 223.1, 224.1, 229.1, 348/230.1, 234, 241, 251, 254, 255
See application file for complete search history.

(56) References Cited

U.S. PATENT DOCUMENTS

| 7,834,921 | B1 * | 11/2010 | Pinto et al. | 348/251 |
| 2002/0135688 | A1 * | 9/2002 | Niikawa | 348/251 |
| 2006/0132627 | A1 * | 6/2006 | Ikuta | 348/252 |
| 2008/0278613 | A1 * | 11/2008 | Hunter et al. | 348/308 |
| 2009/0051792 | A1 * | 2/2009 | Arimoto et al. | 348/251 |

* cited by examiner

*Primary Examiner* — Twyler Haskins
*Assistant Examiner* — Peter Chon
(74) *Attorney, Agent, or Firm* — HM Law Group LLP; Vani Moodley (57) ABSTRACT

In one embodiment of the invention, there is provided a method of correcting a captured image for lens shading artifacts, comprising for a given lens determining a function L(x,y) being a lens shading correction function to be applied to images captured by the lens in order to correct for lens shading artifacts; applying a sampling technique to sample the function L(x,y) at selected points; and storing the sampled function L(x,y) in memory.

13 Claims, 8 Drawing Sheets

TWO-DIMENSIONAL LENS SHADING CORRECTION

FIELD

Embodiments of the invention relate to a method and system to correct an image for artifacts due to lens shading.

BACKGROUND OF THE INVENTION

Figure 1:
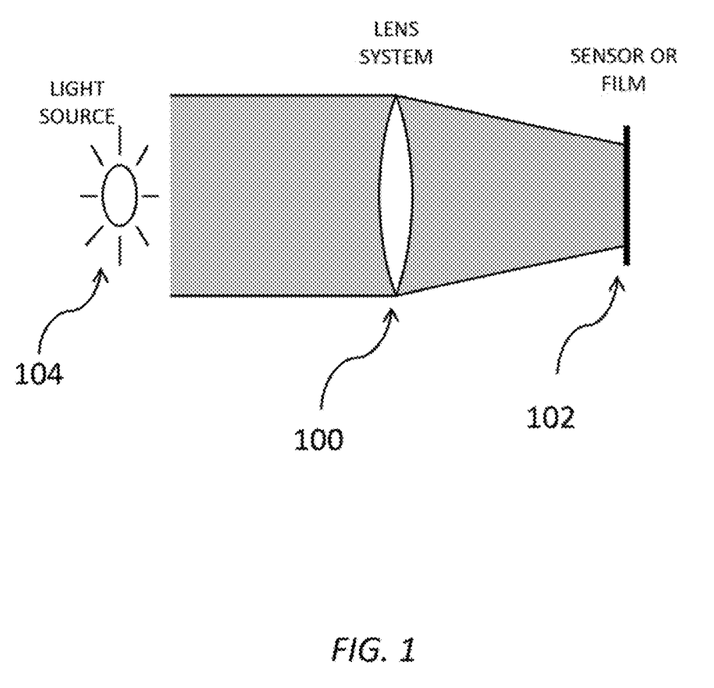
FIG. 1 shows an image capturing system.

FIG. 1 of the drawings shows a typical image capturing system comprising a lens system 100 and a sensor (or film) 102 to capture an image illuminated by a light source 104.

In image capturing systems involving the lenses such as the one shown in FIG. 1 of the drawings, the light distribution by the lens system is non-uniform, causing a captured image to have some light intensity fall-off toward the edges of the image. This artifact is called the lens shading artifact or vignette.

Figure 2:
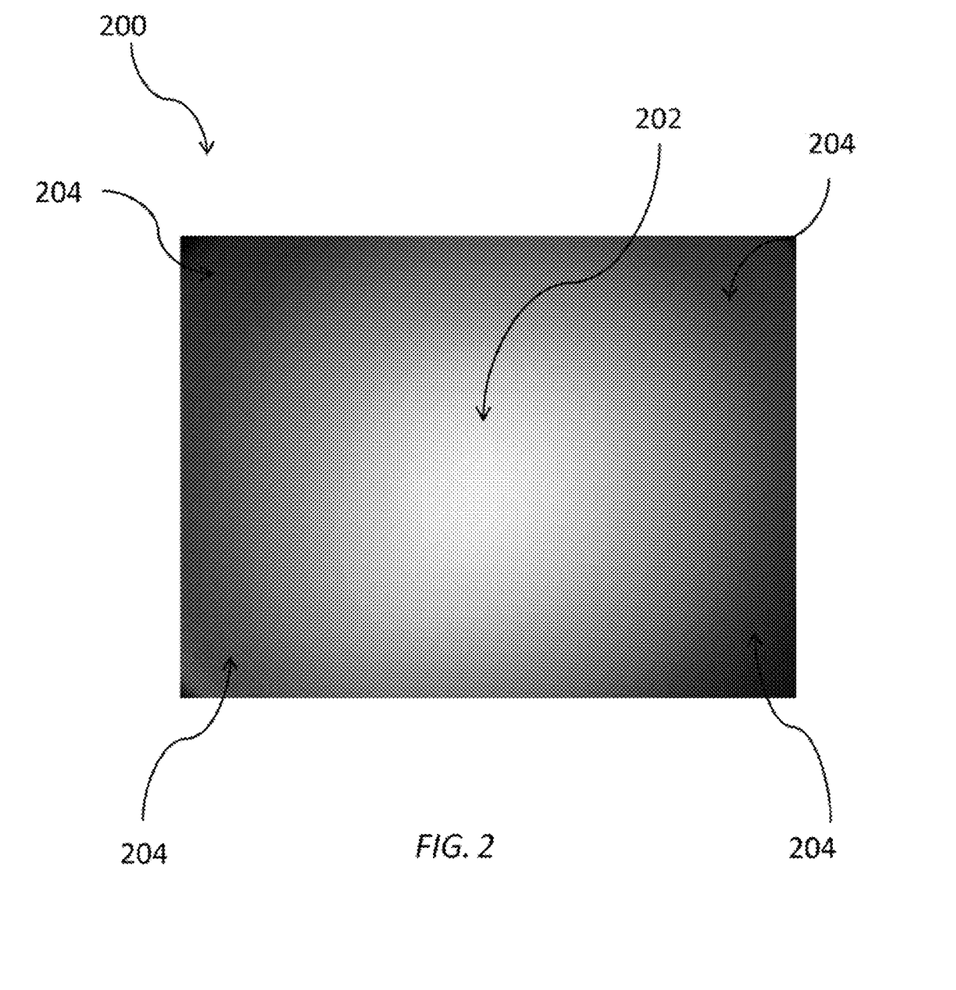
FIG. 2 illustrates the lens shading effect.

FIG. 2 of the drawings illustrates the effect of the lens shading artifact on a captured image. Referring to FIG. 2, it will be seen that a captured image 200 includes a central circular region 202 where the light intensity is the brightest. The light intensity fails off radially away from the center region 202. Edges 204 at the corners at the image 200 show the greatest fall off in light intensity.

The lens shading artifact may be removed by multiplying the light intensity l(x,y) at the image location (x,y) by a lens shading correction amount L(x,y)

$$I_{corrected}(x,y) = l(x,y) \times L(x,y) \quad (1)$$

In reality, for image capturing systems that include an image sensor, the sensor might contribute offset terms that would make the Equation (1) more complex. The offset terms are not considered so as not to obscure the invention. However, one skilled in the art will know how to modify Equation (1) with the offset terms.

The lens shading artifact may be modeled and the function L(x,y) may be computed from the model. Because the function L(x,y) is a two-dimensional (2D) function with two variables x and y, its model tends to be complicated and expensive to implement in hardware.

SUMMARY

In one embodiment of the invention, there is provided a method of correcting a captured image for lens shading artifacts, comprising:
  for a given lens determining a function L(x,y) being a lens shading correction function to be applied to images captured by the lens in order to correct for lens shading artifacts;
  applying a sampling technique to sample the function L(x, y) at selected points; and
  storing the sampled function L(x,y) in memory.

In another embodiment of the invention, there is provided a method of correcting a captured image for lens shading artifacts due to a lens used in generating the captured image, comprising:
  reading image data corresponding to the captured image;
  selecting stored sample points for a two-dimensional lens shading correction function for the lens from memory, and
  in respect of image data falling between the sample points then generating missing values for the two-dimensional lens shading correction function based on the stored sample points.

In another embodiment of the invention, there in provided an image processor, comprising:
  data reconstruction logic to reconstruct missing data points for a two-dimensional lens shading correction function; and
  an image correction block based on the reconstructed missing data.

In yet another embodiment of the invention there is provided an image capture system, comprising:
  camera optics;
  an image sensor; and
  an image processor to process an image captured by the image sensor using the camera optics, the image processor comprising:
  data reconstruction logic to reconstruct missing data points for a two-dimensional lens shading correction function; and
  an image correction block based on the reconstructed missing data.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the present invention disclose a method of correcting for lens shading artifacts in a captured image based on a two-dimensional (2D) lens shading correction function for the lens used to capture the image.

The method will be described with reference to FIG. 1 of the drawings.

Referring to FIG. 1, there is shown a camera system 300 in accordance with one embodiment of the invention. The camera system 300 includes camera optics 302 coupled to an image sensor 304. The image sensor 304 captures images through a lens 303 of the camera optics 302 and stores the images in an image buffer 306. Image processor 308 processes images captured by the image sensor 304. The image processor 308 includes lens shading correction logic 310. The camera system 300 has been greatly simplified by leaving out a great many components so as not to obscure the present invention. However, one of ordinary skill in the art would understand these components to form the camera system 300.

It is to be understood that the camera system 300 is representative of any device that includes a camera capable of capturing images. Thus, digital cameras, camera-equipped mobile phones, etc. would be representative examples the camera system 300.

The lens shading correction logic 310 comprises the logic required to perform the method. In accordance with embodiments of the invention, the lens shading correction logic 310 may be implemented in software, hardware, or a combination of both software and hardware.

Figure 3A:
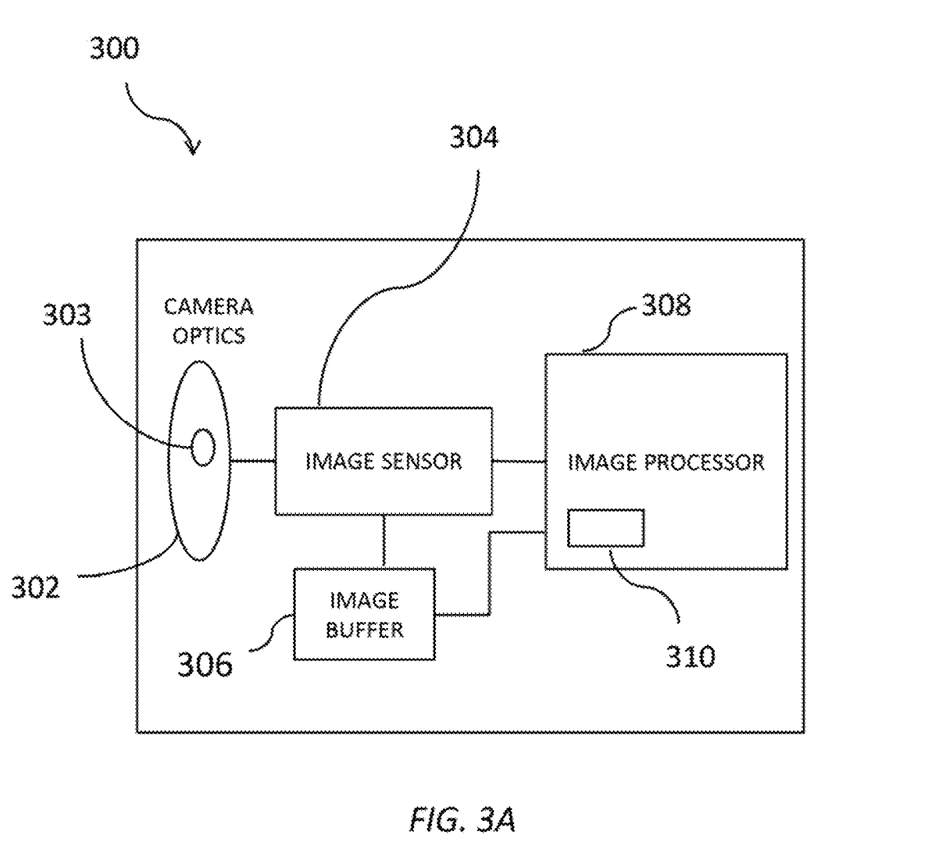
FIG. 3A shows a high-level block of an imaging system comprising an image processor that includes lens shading correction logic in accordance with one embodiment of the invention.
Figure 3B:
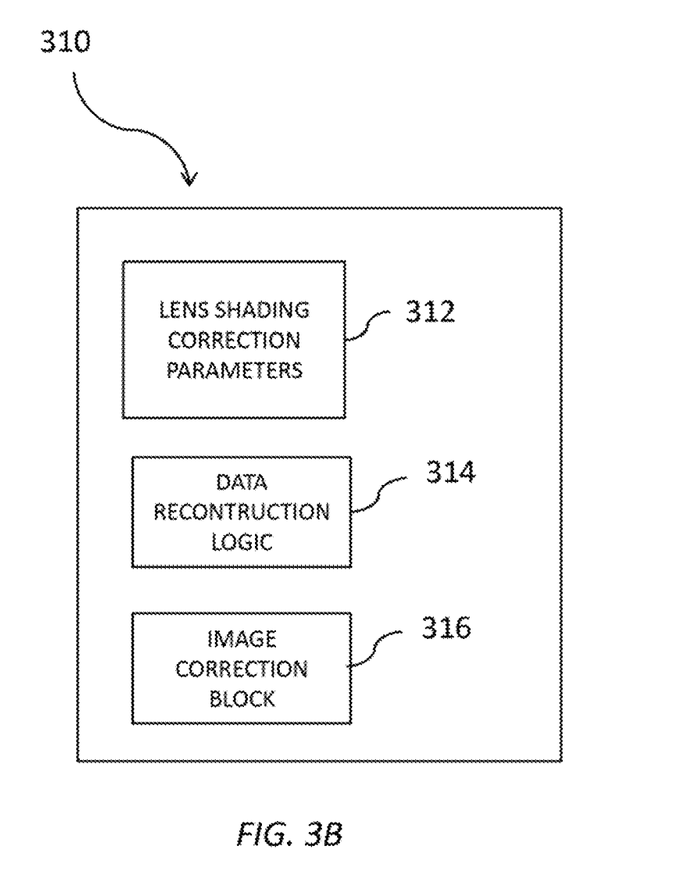
FIG. 3B shows a block diagram of the components the lens shading correction logic of FIG. 3A.

Referring to FIG. 3, in one embodiment the lens shading correction logic 310 includes lens shading correction parameters 312, data reconstruction logic 314, and an image correction block 316. The function and operation of these components will be clear from the description below.

The method comprises the following broad steps: construct the surface for the function L(x,y), subsample the surface to build a two-dimensional (2D) table, and reconstruct the function L(x,y) from the table data.

1. Construct L(x,y)

In accordance with one embodiment of the invention, in order to construct the surface L(x,y), a uniform white or gray image is captured through the lens whose lens shading surface L(x,y) is to be determined, i.e. the lens 303 of the system 300. If the captured image is I(x,y) then based on equation (1):

$$L(x, y) = \frac{I_{corrected}(x, y)}{I(x, y)} \quad (2)$$

The image data captured at the center of the lens 303 does not have the lens shading artifact. Thus, in one embodiment, the corrected image is normalized to the brightness of image data captured through the center of the lens 303.

In one embodiment, the brightest spot in the captured image is deemed to have been captured through the center of the lens, so $$I_{corrected}(x,y) = \text{Max}(I(x,y)) \quad (3)$$

Combining (3) and (2), yields the following equation:

$$L(x, y) = \frac{\text{Max}(I(x, y))}{I(x, y)} \quad (4)$$

In one embodiment, to improve the data for L(x,y), the image data l(x,y) may be computed as an average over multiple image captures. On the final l(x,y), a local smoothing filter such as moving average or curve fitting may be used to improve the data.

Figure 4:
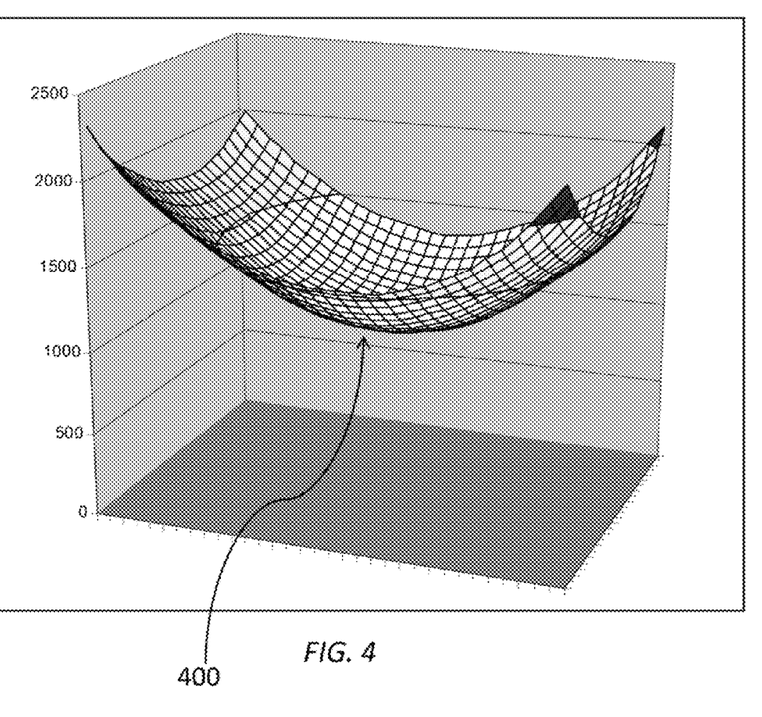
FIG. 4 shows a lens shading correction function L(x,y) for the image capturing system of FIG. 1.

Referring to FIG. 4 of the drawings, reference numeral 400 shows surface L(x,y) constructed for the lens 303, in accordance with embodiment of the invention.

2. Build 2D Table

If an image to be corrected has width W and height H, then the camera system 300 must store W×H points of data for the lens shading correction function L(x,y). For example, if the system 300 were a three megapixel camera then the system 300 would be required to store 3 million data points in its memory.

In one embodiment the method of the present invention advantageously cuts down on the data points that the system 300 would need to store in memory for the function L(x,y) in order to correct an image for the lens shading artifact.

The method includes building a 2D table of data points of the function L(x,y). In building the table most of the data for the function L(x,y) is discarded while only a few sample points for the function L(x,y) are kept. In one embodiment, the missing data for the function L(x,y) corresponding to the discarded data points may be calculated based on the stored data points, thus effectively reconstructing the lens shading correction function L(x,y). The calculation of the missing data is performed by the lens shading correction logic 310 at the time of processing a captured image.

Since the function L(x,y) for most lenses is very smooth, in reality, more than 99.91 of the data points for the function L(x,y) may be discarded.

To build the 2D table, in one embodiment data for the function L(x,y) is sampled and stored in a memory as the lens shading correction parameters 312 of the system 300. The non-sampled data is discarded. The sampling points are chosen carefully so that the missing data can be reconstructed with minimum errors.

Figure 5:
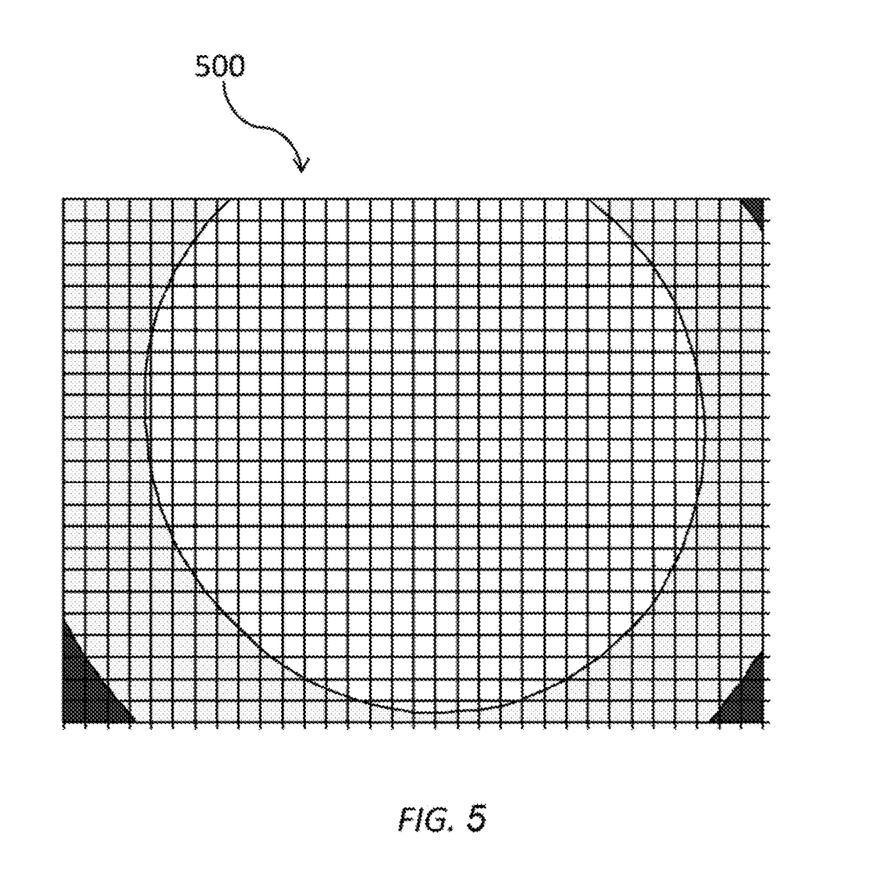
FIG. 5 illustrates a uniform sampling grid used to sample the lens shading correction function L(x,y), in accordance with one embodiment of the invention.

The invention is not limited to any particular sampling method. In one embodiment, the sample paints are fixed and equally spaced. For this type of sampling more storage but less processing power would be required. On the other hand, a variable sample points would take less storage but might need a lot of processing power FIG. 5 illustrates a uniform sampling grid 500 used to sample the lens shading correction function L(x,y), in accordance with one embodiment of the invention.

The fixed and equally spaced sample points are located at the grid intersections.

Figure 6:
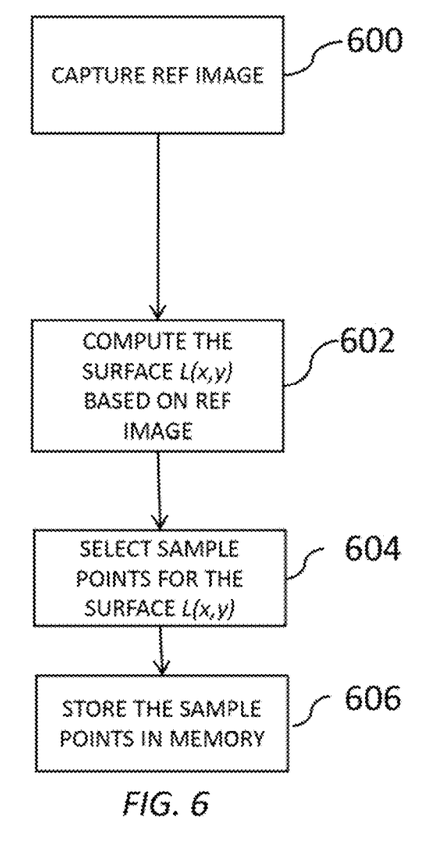
FIG. 6 shows a flowchart of operations performed to generate sample points corresponding to the lens shading correction function L(x,y) of FIG. 4, in accordance with one embodiment of the invention.

FIG. 6 of the drawings shows the operations performed in determining L(x,y) building the 2D table, in accordance with one embodiment. Referring to FIG. 5, at block 600 a reference image is captured using the lens 303. As noted above, in some embodiments more than one reference image may be captured and the multiple images then averaged and soothed into a single reference image.

At block 602, the function/surface L(x,y) is computed for the lens 303. At block 604 a sampling operation is performed in order to select samples points for the function L(x,y). At block 606, the selected sample points are stored in memory as the parameters 312.

3. Reconstruct L(x,y)

The function of the data reconstruction logic 310 is to reconstruct the missing data for the lens shading correction function L(x,y). In one embodiment the data reconstruction logic 310 implements interpolation methods for this purpose. Since the lens shading surfaces are very smooth, in one embodiment, bilinear or bicubic interpolation may used for the reconstruction.

Figure 7:
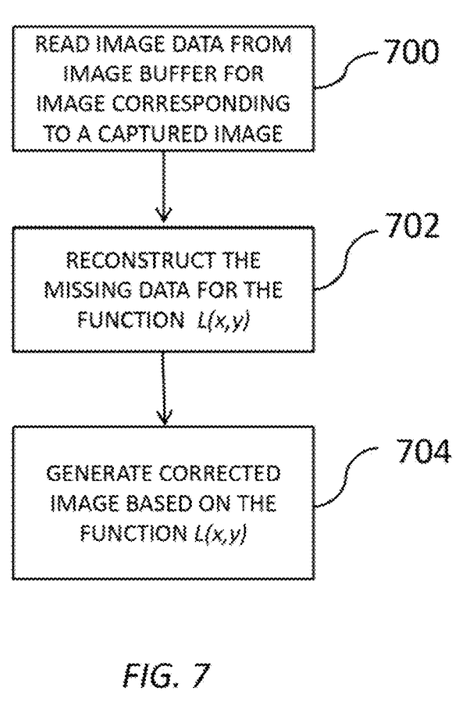
FIG. 7 shows a flowchart of operations to correct a captured image for the lens shading artifact based on the lens shading correction function L(x,y), in accordance with one embodiment of the invention.

FIG. 7 shows a flowchart of operations to correct a captured image for the lens shading artifact based on the lens shading correction function L(x,y), in accordance with one embodiment of the invention. Referring to FIG. 7, at block 700 image data is read from the image buffer 306. The image data corresponds to the captured image.

At block 702, the missing data for the function L(x,y) is reconstructed using data reconstruction logic 314. At block 704, a corrected image is generated based on the function L(x,y). The block 704 is performed by the image correction block 316.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

The invention claimed is:

1. A method of correcting a captured image for lens shading artifacts, comprising:
   capturing a plurality of reference images with a lens;
   averaging the plurality of captured reference images to determine a single reference image;
   using the determined single reference image to determine, for the lens, a two-dimensional lens shading correction function L(x,y) which is a function of an image location (x,y) and which is to be applied to subsequent images captured by the lens in order to correct for lens shading artifacts;
   applying a sampling technique to sample the determined function L(x,y) at selected points (x,y) based on a sampling grid; and
   storing a two-dimensional table comprising data points (x,y) corresponding to the sampled function L(x,y) in memory.

2. The method of claim 1, wherein the sampling grid comprises sampling points (x,y) that are fixed and equally spaced.

3. The method of claim 1, wherein the sampling grid comprises sampling points (x,y) that are variable.

4. The method of claim 1, wherein said averaging the plurality of captured reference images to determine a single reference image comprises smoothing the plurality of captured reference images to determine the single reference image.

5. A method of correcting a captured image for lens shading artifacts due to a lens used in generating the captured image, comprising:
   reading image data corresponding to the captured image;
   accessing a two-dimensional table to select stored sample points (x,y) for a two-dimensional lens shading correction function for the lens determined by capturing a plurality of reference images with the lens, and averaging the plurality of reference images into a single reference image wherein the stored sample points (x,y) are based on a sampling grid comprising sampling points (x,y); and
   in respect of image data falling between the sample points (x,y) then generating missing values for the two dimensional lens shading correction function based on the selected sample points (x,y).

6. The method of claim 5, wherein generating the missing values is based on interpolation.

7. The method of claim 6, wherein said interpolation is bilinear or bicubic interpolation.

8. An image processor, comprising:
   a memory configured to store lens shading correction parameters for storing a two-dimensional table comprising data points (x,y) corresponding to a sampled two-dimensional lens shading correction function L(x,y), wherein the function L(x,y) is determined by capturing a plurality of reference images with a lens, and averaging the plurality of reference images into a single reference image, wherein the stored sample points (x,y) are based on a sampling grid comprising sampling points (x,y);
   data reconstruction logic configured to access the two dimensional table stored in the memory, to select stored sample points (x,y) for the two-dimensional lens shading correction function, and to reconstruct missing data points of the two-dimensional lens shading correction function based on the selected sample points (x,y); and
   an image correction block configured to correct a captured image based on the reconstructed missing data.

9. The image processor of claim 8, wherein the reconstruction of the missing data points is performed based on interpolation of the selected sampled points (x,y) from the two-dimensional table.

10. The image processor of claim 8, wherein the averaging of the plurality of captured reference images into a single reference image comprises smoothing the plurality of captured reference images.

11. An image capture system, comprising:
    camera optics comprising a lens;
    an image sensor configured to capture images from the camera optics; and
    an image processor configured to process an image captured by the image sensor using the camera optics, the image processor comprising:
    a memory configured to store lens shading correction parameters for storing a two-dimensional table comprising data points (x,y) corresponding to a sampled two-dimensional lens shading correction function L(x,y), wherein the function L(x,y) is determined by capturing a plurality of reference images with the lens, and averaging the plurality of reference images into a single reference image, wherein the stored sample points (x,y) are based on a sampling grid comprising sampling points (x,y);
    data reconstruction logic configured to access the two dimensional table stored in the memory, to select stored sample points (x,y) for the two-dimensional lens shading correction function, and to reconstruct missing data points of the two-dimensional lens shading correction function based on the selected sample points (x,y); and
    an image correction block configured to correct a captured image based on the reconstructed missing data.

12. The image capture system of claim 11, wherein the reconstruction of the missing data points is performed based on interpolation of the selected sampled points (x,y) from the two-dimensional table.

13. The image capture system of claim 12, wherein said interpolation is bilinear or bicubic interpolation.

* * * * *